Patented July 14, 1925.

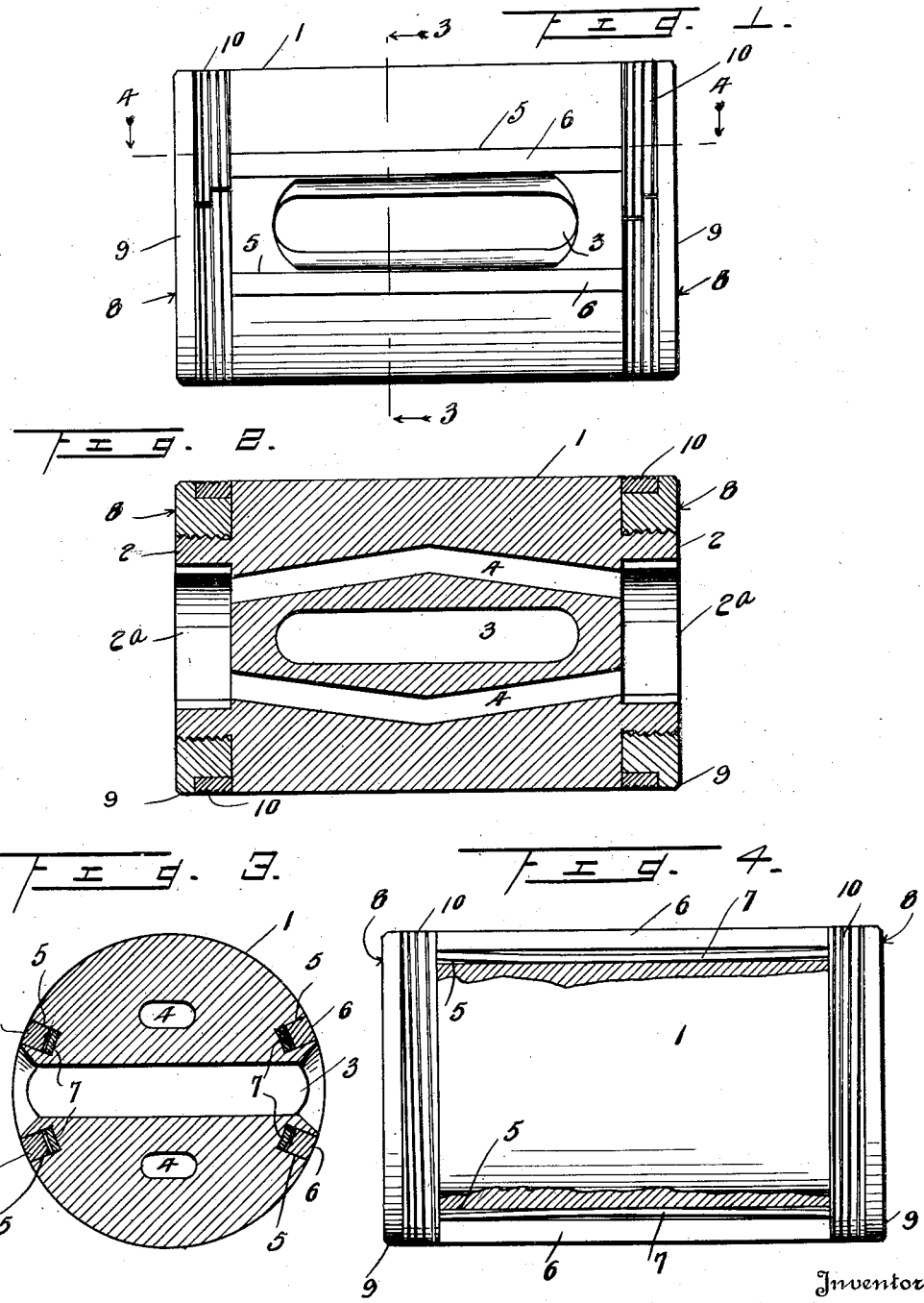

1,546,093

UNITED STATES PATENT OFFICE.

THOMAS M. McKELVY, OF FRESNO, CALIFORNIA.

ROTARY VALVE.

Application filed March 15, 1923. Serial No. 625,366.

*To all whom it may concern:*

Be it known that I, THOMAS M. McKELVY, a citizen of the United States, residing at Fresno, in the county of Fresno and State of California, have invented certain new and useful Improvements in Rotary Valves; and I do hereby declare the following to be a full, clear, and exact description of the invention, such as will enable others skilled in the art to which it appertains to make and use the same.

The invention has relation to valves of the rotary type embodying metallic packing and transverse and longitudinal ports, the packing being self-expansible and disposed to prevent leakage, and is designated more particularly as an improvement on the valve forming the basis for the applications filed by me September 12, 1921, and April 14, 1922, Sr. Nos. 500,029 and 552,488, respectively.

The principal object of the invention is the mounting of the packing rings at the ends of the valve and the positive securing of the rings to prevent displacement thereof.

A further purpose of the invention is the securement of the packing confining rings by a screw thread joint, the thread of one joint being right and the thread of the other joint left, the valve being rotated in a direction tending to tighten said joints and prevent any possible loosening of the confining rings.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a side view of a rotary valve embodying the invention,

Figure 2 is a central longitudinal section thereof,

Figure 3 is a transverse section on the line 3—3 of Figure 1, and

Figure 4 is a detail longitudinal section on the line 4—4 of Figure 1, looking in the direction of the arms.

Corresponding and like parts are referred to in the following description and designated in the several views of the drawings by like reference characters.

The numeral 1 designates the body of the valve which has opposite end portions reduced, as indicated at 2, and externally screw threaded, the thread at one end being right and the thread at the opposite end left. A port 3 is formed centrally of the valve and extends longitudinally and transversely thereof, said port flaring at opposite sides, as indicated most clearly in Figure 3. The reduced ends 2 are hollow and longitudinal ports 4, disposed upon opposite sides of the port 3, communicate at opposite ends with the inner spaces $2^a$ of the reduced ends 2. Said ports 4 provide passages to convey oil through the valve from one end to the other and to the bearings therefor which are received in the spaces $2^a$, without any external connections, and in a manner to keep the valve cool to prevent overheating. Longitudinal grooves 5 are formed in the outer side of the body 1 adjacent the flared ends of the port 3 and extend the entire length of the body portion of the valve. Metallic packing 6 is fitted in the grooves 5 and is normally urged outwardly by flat springs 7 which are slightly bowed and interposed between the bottom of the grooves 5 and the inner faces of the packing 6. The packing 6 consists of metal bars of a length equal to the length of the body 1 so as to come flush at their ends with the extremities of the body and abut the packing at the ends thereof.

Rings 8 are threaded upon the reduced ends 2 of the valve body and are formed with outer flanges 9. The reduction of the ends of the valve body so as to accommodate rings 8, permit the grooves 5 to be easily formed. The screw thread joint between the ring 8 and the hollow projection 2 at one end of the valve body is right and the screw thread joint between the ring 8 and the hollow projection 2 at the opposite end of the valve body is left and the valve is mounted to rotate in a direction tending to tighten the rings 8. Split packing rings 10 are mounted upon the rings 8 and are confined between the outer flanges 9 thereof and the ends of the valve body. The packing rings 10 insure the formation of tight joints the ends of the valve and the longitudinal packing 6. Since the spring 7 engages the packing strips 6 adjacent the ends thereof only, the packing strips cannot be bowed into the port, such as A of the valve casing or mounting, with the result that the bore of the casing or mounting cannot be scored and no interference will be offered to the free rotation of the valve body. The passages 4 may be of any appropriate size in cross section. The space between the outer flange 9 and the adjacent end of the valve body is such as to snugly receive the packing ring 10 and prevent any binding thereof after the confining ring 8 has been tightly screwed home. The ports 3 and 4 may be formed in any manner, preferably by cores when casting the valve body. Spiral grooves are formed on the outer side of the packing rings, the grooves of one ring being right and the grooves of the other ring left. These grooves extend in a direction to discharge surplus oil towards opposite ends of the valve.

What is claimed is:

1. A rotary valve comprising a body having opposite ends reduced, externally screw threaded and of hollow formation, said body having a longitudinal lubricant port in communication at opposite ends with the hollow reduced ends of the valve body, confining rings threaded upon the reduced ends of the body and having outer flanges, and packing rings mounted upon the confining rings and held between the outer flanges thereof and the lateral walls of the valve body.

2. A rotary valve comprising a body having a medial transverse port and opposite ends reduced and externally screw threaded and of hollow formation and provided with longitudinal lubricant ports at opposite sides of the transverse port and opening through the hollow reduced ends, packing at opposite sides of the transverse port, confining rings threaded upon the reduced ends of the body and having outer flanges, and packing rings mounted upon the confining rings and abutting the longitudinal packing and held between the outer flanges and the confining rings and the adjacent ends of the valve body.

3. A valve having a substantially cylindrical body provided with a transverse port therethrough, said body having a substantially longitudinally extending groove, packing in said groove, said body being reduced at its ends, rings attachable to the ends inwardly of the base wall of the groove, substantially bowed springs disposed in the groove with their ends overlapped by said rings, the ends of said springs being in engagement with the packing adjacent the ends of the latter and out of engagement with the packing intermediate said ends, and packing carried by said rings overlapping the ends of the first mentioned packing.

In testimony whereof I affix my signature in presence of two witnesses.

THOMAS M. McKELVY.

Witnesses:
WALTER SORENSEN,
DAISY E. SORENSEN.